US005597428A

United States Patent [19]
Matsumoto et al.

[11] Patent Number: 5,597,428
[45] Date of Patent: Jan. 28, 1997

[54] METHOD OF SEALING CONTAINERS

[75] Inventors: Tadahiro Matsumoto; Hiroyuki Takahashi, both of Himeji; Kouzaburo Matsuzawa, Tokyo, all of Japan

[73] Assignee: Idemitsu Petrochemical Co., Ltd., Tokyo, Japan

[21] Appl. No.: 454,408

[22] Filed: May 30, 1995

Related U.S. Application Data

[63] Continuation of Ser. No. 101,997, Aug. 4, 1993, abandoned.

[30] Foreign Application Priority Data

Aug. 6, 1992 [JP] Japan .................................. 4-210227

[51] Int. Cl.⁶ .................................................. B65B 7/28
[52] U.S. Cl. ..................... 156/69; 156/292; 156/309.9; 53/478; 53/485
[58] Field of Search ................................. 156/69, 309.9, 156/322, 552, 292, 308.2; 53/300, 389.4, 478, 485, 282, 329.3

[56] References Cited

U.S. PATENT DOCUMENTS

| | | | |
|---|---|---|---|
| 2,651,350 | 9/1953 | Casey et al. | 156/583.4 |
| 3,372,081 | 3/1968 | Hurschman | 53/300 |
| 3,402,873 | 9/1968 | Lauterbach, Jr. | 156/69 |
| 3,701,699 | 10/1972 | Jackson | 156/69 |
| 3,706,175 | 12/1972 | Anderson | 53/478 |
| 3,839,843 | 10/1974 | Stewart, Jr. | 53/485 |
| 3,864,892 | 2/1975 | Molvar | 156/69 |
| 4,167,092 | 9/1979 | Medwed | 53/329.3 |
| 4,266,993 | 5/1981 | Olsen | 156/69 |
| 4,282,699 | 8/1981 | Embro, Jr. | 53/300 |
| 4,314,865 | 2/1982 | Ottaviano | 156/322 |
| 4,379,008 | 4/1983 | Gross et al. | 156/69 |
| 4,691,500 | 9/1987 | Danforth et al. | 156/69 |
| 5,117,613 | 6/1992 | Pfaffmann | 156/69 |
| 5,157,901 | 10/1992 | Okamoto et al. | 156/69 |
| 5,160,391 | 11/1992 | Thomas, Jr. | 156/69 |

FOREIGN PATENT DOCUMENTS 61-103  1/1986  Japan .

OTHER PUBLICATIONS

Dictionary of Scientific and Technical Terms, 3r Edition, McGraw–Hill, 1984, p. 876.

Primary Examiner—Michael W. Ball
Assistant Examiner—Richard Crispino
Attorney, Agent, or Firm—Flynn, Thiel, Boutell & Tanis, P.C.

[57] ABSTRACT

A method for and an apparatus of sealing containers are disclosed. Before causing thermal fusion of a thermoplastic resin sheet or film and a flange of a container, the flange and thermoplastic resin sheet or film and the flange are pre-heated by respective container and sheet material pre-heaters.

3 Claims, 7 Drawing Sheets

METHOD OF SEALING CONTAINERS

This application is a continuation of U.S. Ser. No. 08/101,997, filed Aug. 4, 1993, now abandoned.

BACKGROUND OF THE INVENTION

1. Field of the Invention

This invention relates to a method for and an apparatus for sealing containers with a flange formed on the outer periphery of the open end, and it is applicable to food or like containers which are sealed by fusing a thermoplastic sheet or film to them.

2. Description of the Related Art

It is a recent trend of food packages to use thermoplastic resin containers in lieu of metal cans. To seal such thermoplastic resin containers, a heat seal method is used extensively. In this method, a sheet or film of a thermoplastic resin, such as polyolefine (hereinafter referred to as sheet material) is overlapped over a flange formed on the outer periphery of the open end of the container, and in this state it is pushed from above with a seal bar heated to a constant temperature to thereby fuse it to the container.

In this heat seal system, a certain time is required for the heating of the container and the sheet material at the time of the fusing. Therefore, a limitation is imposed on the number of containers that can be processed in unit time. Accordingly, various sealing apparatuses have heretofore been proposed to Permit faster sealing operation.

Among the sealing apparatuses for fast sealing is one, which is of stamping type with a multiple row arrangement of sealing bars for pressing and fusing sheet material. There is also a box motion type sealing apparatus, in which seal bar is moved in a box motion. Further, there is a high frequency sealing apparatus utilizing a high frequency oscillator. Further, there is a sealing apparatus of supersonic wave sealing type, in which a high frequency voltage is applied to sheet material for fusion thereof with heat generated as a result of dielectric loss of the sheet material. Furthermore, there is a package container sealer, in which a sheet material is fused to a container with heated heat roller (as disclosed in Japanese Patent Laid-Open Publication NO. S61-103).

However, the prior art stamping type sealing apparatus using multiple rows of sealing bars, has disadvantages that it leads to increased size and cost.

The sealing apparatus of supersonic frequency sealing type is also expensive and unsuited to general purpose sealing. The high frequency sealing can not be applied to low dielectric loss sheets, i.e., thermoplastic resin sheets with no polarity. That is, limitation is imposed on the kind of sheet material that can be used.

The method of sealing package containers as disclosed in Japanese Laid-Open Publication No. S61-103, is readily conceivable by a person having ordinary knowledge in the art in that sheet material is fused to container by using heat roller. This method is thought to have an advantage in that it is applicable to different containers having various shapes. However, it has many basic problems concerning the stability of the seal, that is, wrinkles in the sealed portion, lack of uniformity of the seal, insufficient mechanical strength of the seal, rate of sealing, warping and other deformation of flange, etc.

The present invention is intended in the light of the above circumstances, and its object is to provide a method for and an apparatus of sealing containers, which permit faster and more inexpensive sealing of containers than in the prior art methods by fusing a thermoplastic resin sheet on a flange of the container and are applicable to different containers having various shapes.

SUMMARY OF THE INVENTION

According to the invention, there is provided a method of sealing containers, which comprises the steps of placing a thermoplastic resin container having an open end and an integral peripheral flange encircling the open end into a bucket so that the flange on the container overlies a rim, also known as a support part, on the bucket, the rim being provided with an anti-slip construction to thereby prevent the occurrence of a relative slipping movement between the rim and the flange, overlapping a thermoplastic resin sheet or film over the flange and causing thermal fusion of the thermoplastic resin sheet or film and the flange, and in which a step of pre-heating the flange and the thermoplastic sheet or film is carried out before the step of causing thermal fusion of the flange and thermoplastic resin sheet or film.

In the specification, by the term "thermoplastic resin sheet" is meant a sheet material with a thickness of 200 microns or above, and by the term "thermoplastic resin film" is meant a sheet material with a thickness of no greater than 200 microns. These sheet materials are commonly referred to as merely sheet material. The heating temperature in the thermally fusing step is 195° to 225° C. The temperatures of pre-heating the flange and the sheet material in the pre-heating step are 50° to 120° C. If the pre-heating temperature is below 50° C., it is impossible to permit sufficiently fast sealing. If the pre-heating temperature is above 120° C., the sheet material is excessively heated to result in formation of wrinkles. In the thermally fusing step, the sheet material may be pushed against the flange of the container with a pressure of 20 to 50 kgf/cm$^2$. If the pressure is below 20 kgf/cm$^2$, it is impossible to ensure sufficient sealing. If the pressure is above 50 kgf/cm$^2$, on the other hand, such problems as deformation of the flange are posed.

According to the invention, there is also provided a method of sealing containers by overlapping a thermoplastic resin sheet or film, i.e., a sheet material, over a flange formed on the outer periphery of the open end of a thermoplastic container and causing thermal fusion of the sheet material and the flange, which apparatus comprises a base having a support for supporting the flange of the container, and a sealer for clamping and pushing together said sheet material and said flange between it and the base, the sealer including sealing means for causing thermal fusion of the sheet material to the flange, first pre-heating means for pre-heating the sheet material prior to the thermal fusion thereof to the flange, and second pre-heating means for pre-heating at least the flange of the container prior to the thermal fusion of the sheet material to the flange.

The support on the base may be provided with anti-slip means for securing the flange of the container in position. The anti-slip means may comprise a plurality of spike-like members. Alternatively, it may comprise a roulette processed engagement portion, or it may be an engagement portion consisting of silicone rubber.

The sealing means may include two or more parallel sealing rollers, which are driven for rotation by drive means.

The first and second pre-heating means may include pre-heating rollers. The base may be a bucket mounted in chain means. Further, rails for supporting the bucket may be disposed parallel to the chain means such that the bucket can be moved along them.

According to the invention, before causing thermal fusion of the sheet material to the flange on the outer periphery of the open end of the container, the flange and sheet material are pre-heated by the first and second pre-heating means, respectively. Thus, at the time of the fusion the flange and sheet material can be quickly heated to a temperature, at which fusion is possible. It is thus possible to reduce the time required for the fusion and increase the number of works that can be processed for fusion per unit time.

DETAILED DESCRIPTION OF THE PREFERRED EMBODIMENT(S)

Now, a method of and an apparatus for sealing containers embodying the invention will be described.

Figure 1:
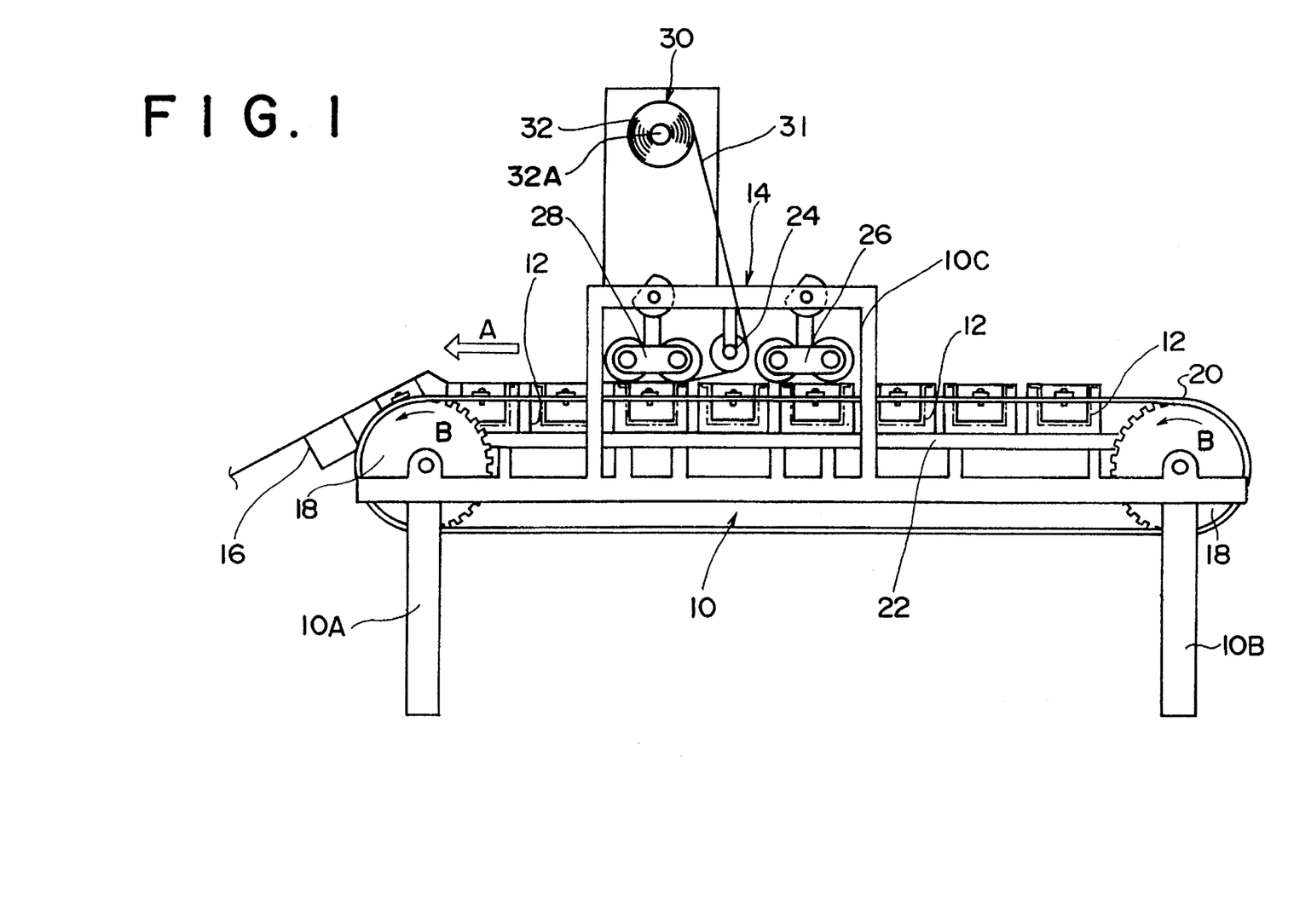
FIG. 1 is a front view showing an embodiment of the apparatus for sealing containers according to the invention.
Figure 2:
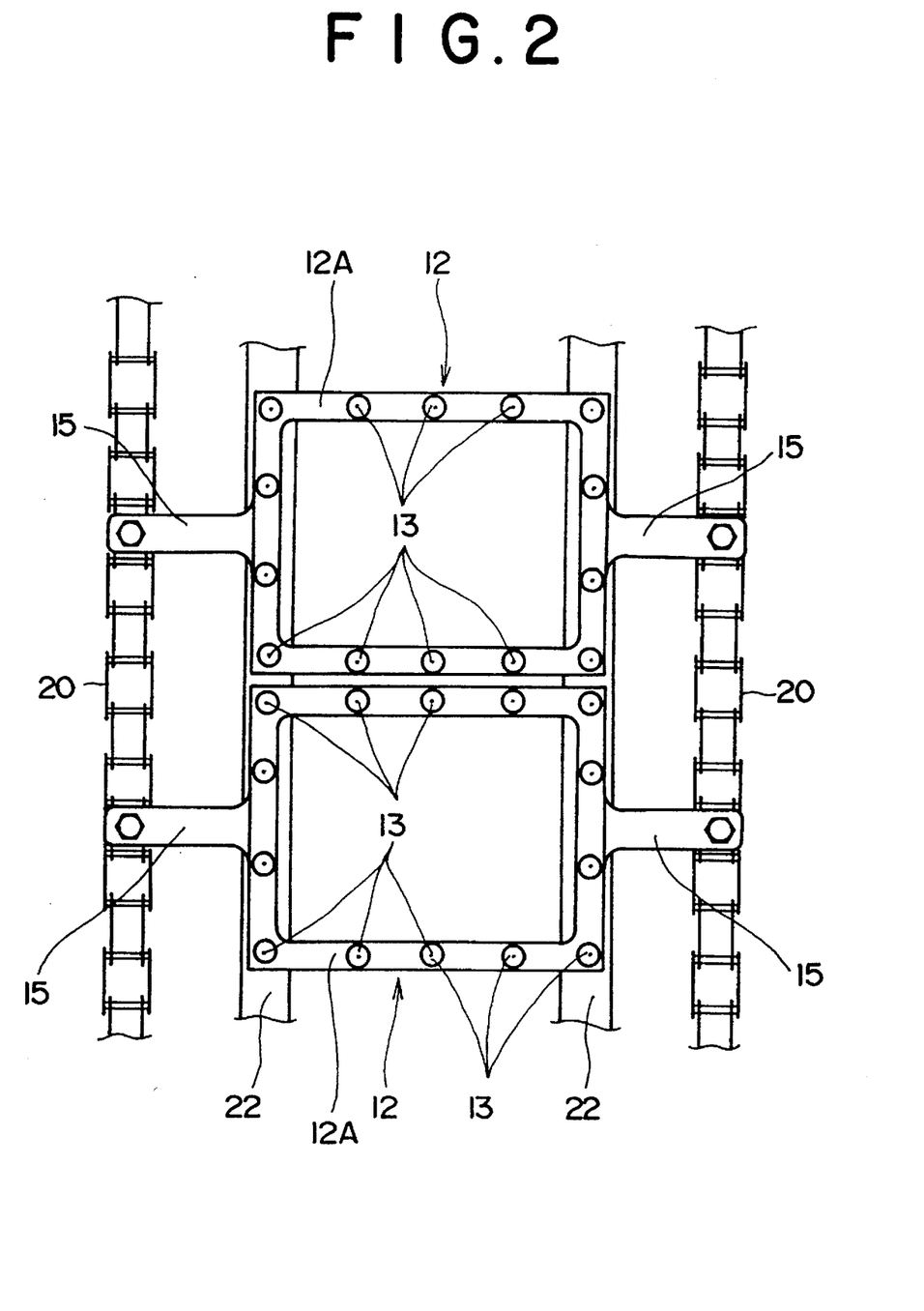
FIG. 2 is an enlarged-scale plan view showing a buckets as base for supporting containers in the sealing apparatus shown in FIG. 1.
Figure 3:
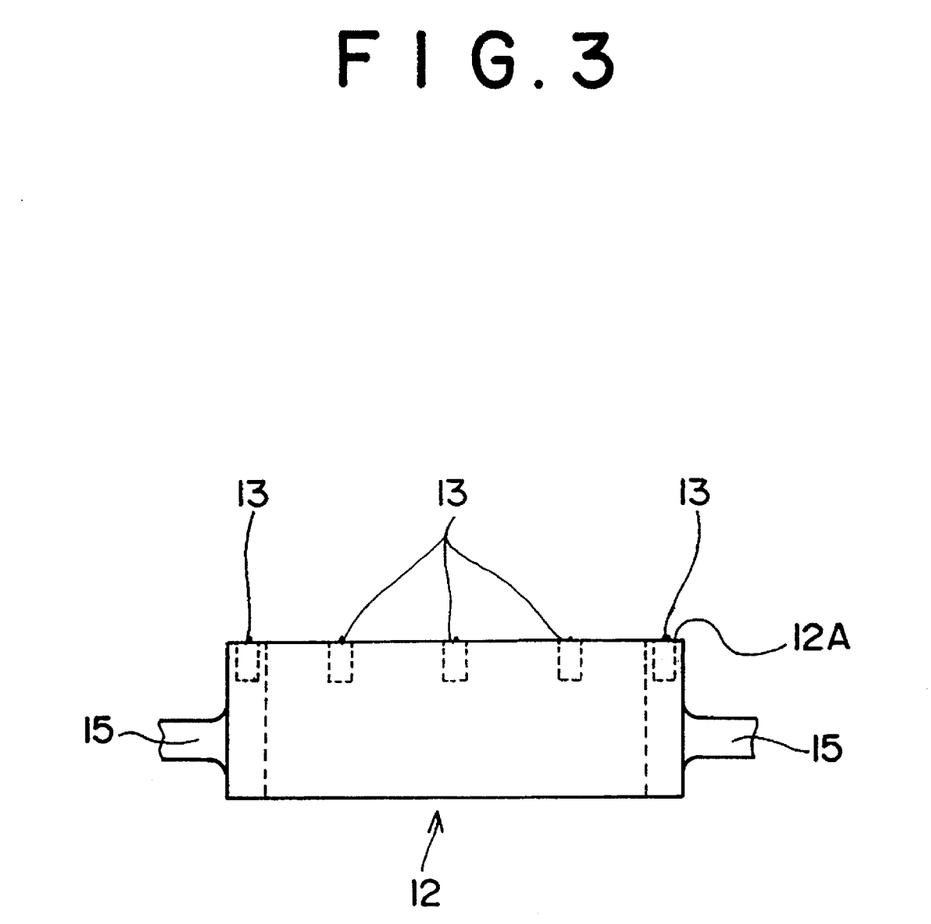
FIG. 3 is a side view showing a bucket as base.

FIG. 1 is a front view showing a sealing apparatus used for the method of sealing containers embodying the invention. FIG. 2 is a is an enlarged-scale plan view showing buckets serving as supports for supporting containers in the sealing apparatus shown in FIG. 1. FIG. 3 is a fragmentary sectional view showing an essential part of the sealing apparatus shown in FIG. 1. FIGS. 5 to 8 show buckets different from those shown in FIG. 3.

The sealing apparatus shown in FIG. 1 comprises a base frame 10, buckets 12 and an apparatus frame 14.

The base frame 10 has legs 10A and 10B for supporting the apparatus frame 14. Above the legs 10A and 10B, four gears are disposed in two pairs. Chains 20 are each passed round the gears 18 in each pair. The two chains 20 extend parallel to the longitudinal direction of the base frame 10. They are driven and moved in the direction of arrow A as one of the gears 18 is driven by a motor (not shown) for rotation in the direction of arrow B. With the movement of the chains 20 the buckets 12 are conveyed in the direction of arrow A.

As shown in FIG. 2, a plurality of buckets 12 are mounted at a fixed interval and each by a pair of connecting members on the opposite side chains 20. The buckets 12 are heated to 50° to 120° C. by a heater (not shown). Each bucket 12 has a top support part or rim 12A which supports a flange 16A formed along the periphery of the open top of each container 16. Although not shown in FIG. 1, buckets 12 are also mounted on the lower runs of the chains 20.

The support part 12a of the bucket 12 is used as a member for receiving seal roller to be described later. While each bucket 12 is conveyed in the direction of arrow A by the chains 20, its bottom is engaged and supported by a pair of rails 22 provided on the base frame 10 in the longitudinal direction thereof. Thus, the buckets 12 supported by the upper runs of the chains 20 are moved with the chains 20 in the direction of arrow A with their bottom sliding along the rails 22.

Figure 5:
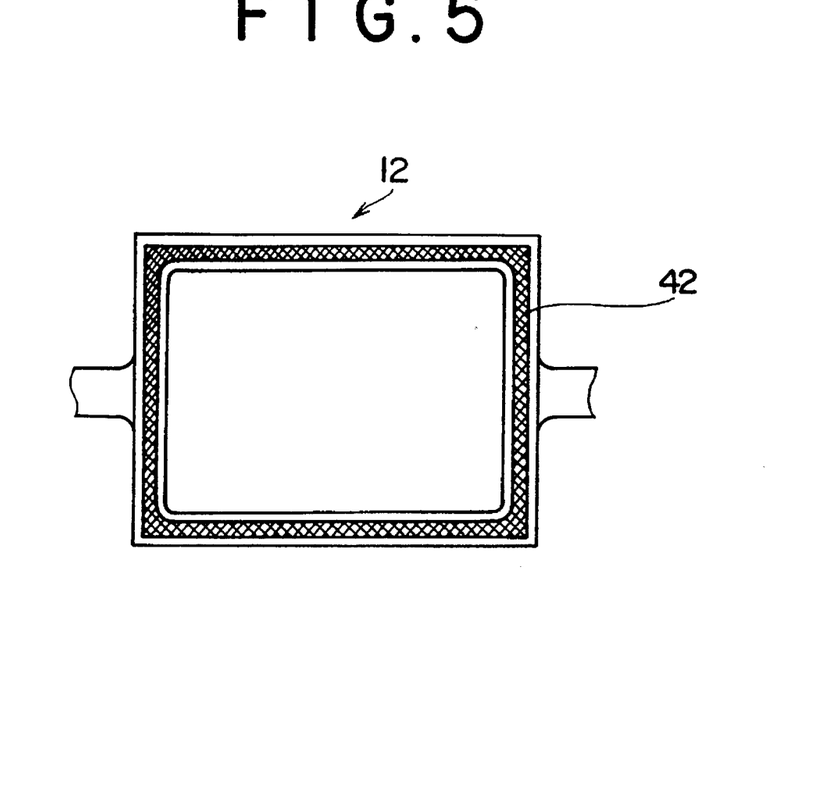
FIG. 5 is a plan view showing a bucket different from those shown in FIG. 3.
Figure 6:
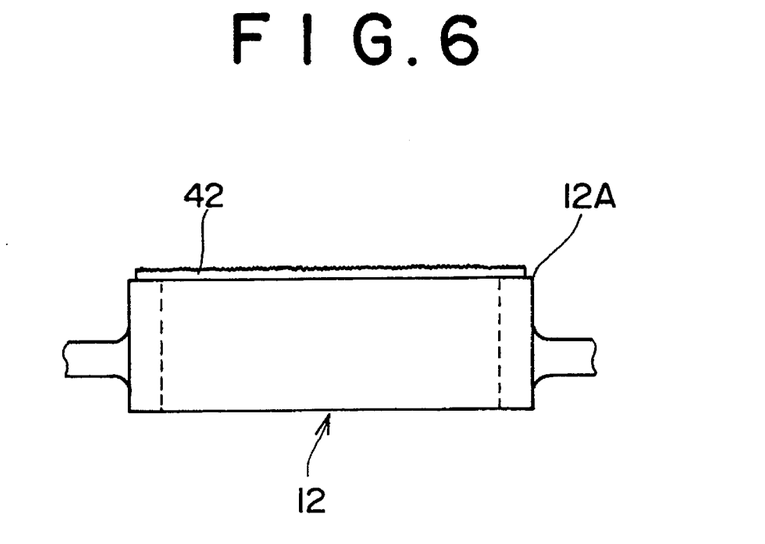
FIG. 6 is a front view of the bucket shown in FIG. 5.
Figure 7:
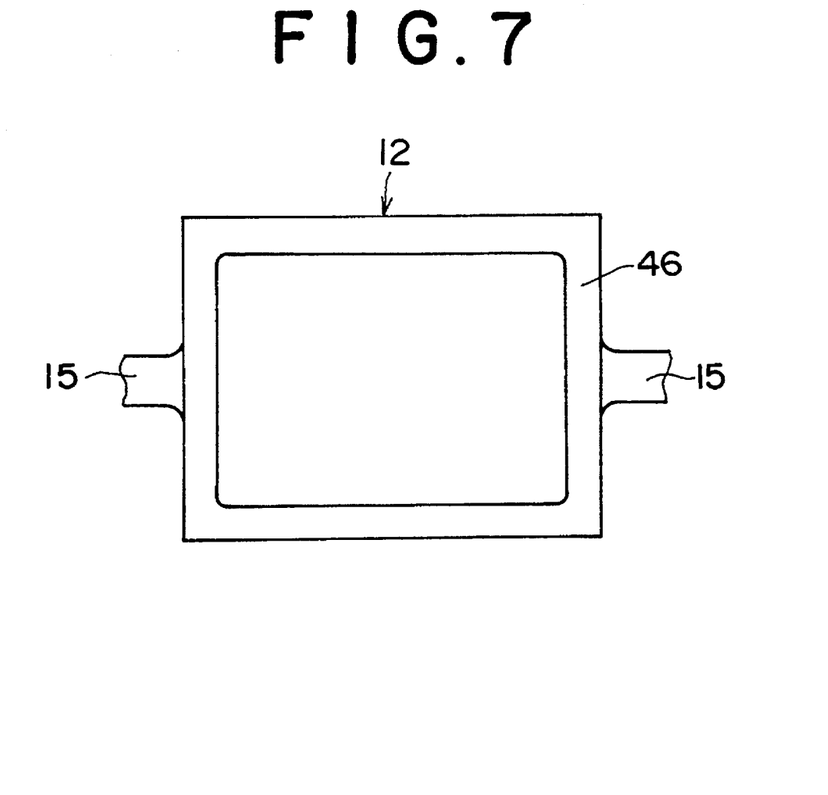
FIG. 7 is a plan view showing a bucket different from those shown in FIGS. 3 and 5.
Figure 8:
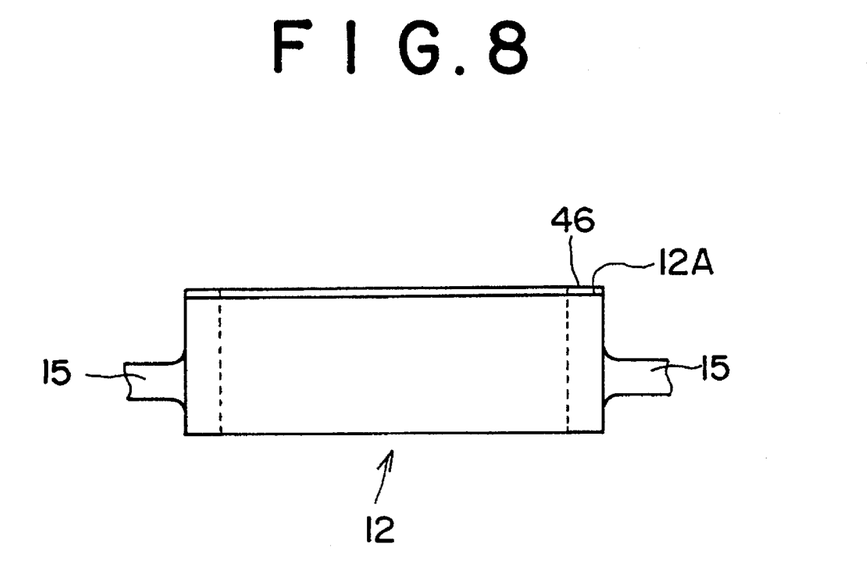
FIG. 8 is a front view showing the bucket shown in FIG. 7.

The support part 12A of the bucket 12, supporting the flange 16A (see FIG. 4) of the container 16, is provided with anti-slip means. FIGS. 2 and 3 show an example of the anti-slip means. In this instance, it comprises a plurality of spike members 13 buried in the support part 12A. FIGS. 5 and 6 show another example of the anti-slip means. In this instance, the means comprises a roulette processed or knurled part 42 formed on the support part 12A of the bucket 12. FIGS. 7 and 8 show a further example of the anti-slip means. In this instance, the means comprises an engagement layer 46 of silicone rubber formed on the support part 12A of the bucket 12.

The spike members 13 shown in FIGS. 2 and 3 have a function of securing the container 26 supported in the bucket 12 against deviation when welding a set material. The spike members 13 project a predetermined extent from the support part 12A, the extent of projection being smaller than the thickness of the flange 16A of the container 16. In the case of the engagement layer 46 shown in FIGS. 7 and 8, it is possible to use, in lieu of silicone rubber, a thin layer of rubber or polycarbonate with a thickness of 1 mm or below.

Figure 4:
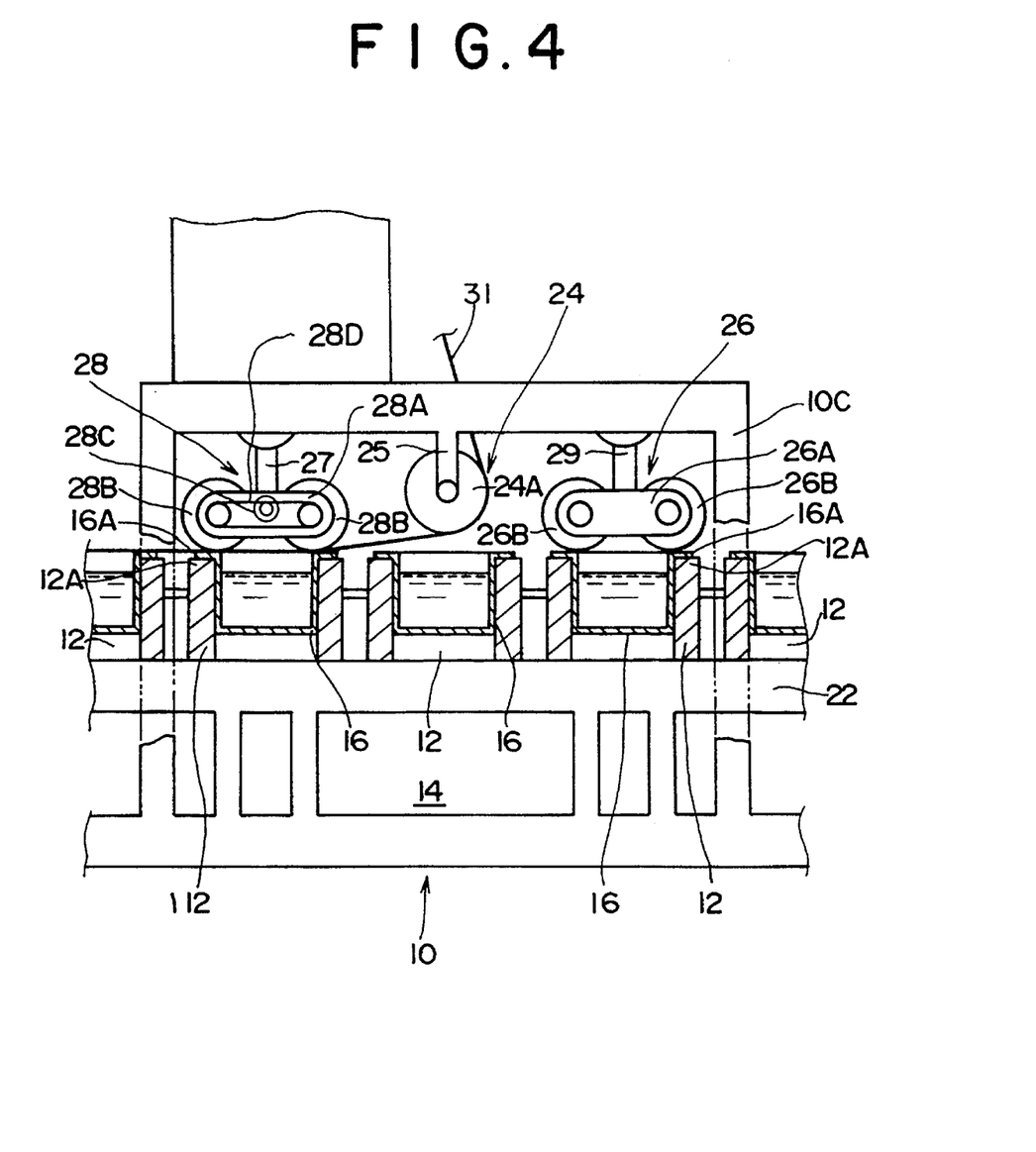
FIG. 4 is a side view, partly in section, showing an essential part of the sealing apparatus shown in FIG. 1.

The apparatus frame 14, as shown in FIG. 4, supports a sheet material pre-heater as a first pre-heating means, a container pre-heater 26 as a second pre-heating means, a sealer 28 and a sheet material source 30 for supplying a sheet material 31. The sheet material 31 may be a thermoplastic sheet with a thickness of 200 microns or above or a thermosetting film with a thickness of no greater than 200 microns.

Above the base frame 10 a top frame 10C is provided. A bracket 25 is secured to a central part of the top frame 10C. Rotatably supported in the bracket 25 is a pre-heating roller 24A, on the outer periphery of which the sheet material 31 engages. The pre-heating roller 24A and a heater (not shown) for heating this roller 24A constitute the sheet material pre-heater 24. In the sheet pre-heater 24, the pre-heating roller 24A is heated to 80° to 150° C. to pre-heat the sheet material 31 up to 120° C. before thermally fusing the sheet material 31 to the flange 16A of the container 16.

The top frame 10C has a bracket 29, in which a bracket 26A is mounted. The bracket 26A is supported by the top frame 10C for vertical movement by a cam mechanism (not shown). The bracket 26A rotatably supports two pre-heating rollers 26B. The bracket 26A, two pre-heating rollers 26B AND a heater (not shown) for heating the pre-heating rollers 26B constitute the container pre-heater 26. The container pre-heater 26 pre-heats the flange 16A of the container 16 to 50° to 120° C. by causing the pre-heating rollers 26B to be in contact with the flange 16A of the container 16 prior to thermal fusion of the sheet material 31.

The top frame 10C has a further bracket 27, in which a bracket 28A is mounted for vertical movement by lift means (not shown). The bracket 28A supports two parallel rollers 28B as sealer. The seal rollers 28B are driven for rotation by a motor 28C and a belt 28D as drive means. The motor 28C is a variable speed motor and is driven in a timed relation to the speed of conveying the buckets 12.

The bracket 28A, two seal rollers 28B and a heater (not shown) for heating these seal rollers 28B, constitute the sealer 28. In the sealer 26, the sheet material 31 is pushed by the seal rollers 28B with a pressure of 20 to 50 kgf/cm² against the flange 16A of the container 16 supported on the support part 12A of the bucket 12, while it is heated, whereby it is thermally fused against the flange 16A.

As shown in FIG. 1, the sheet material source 30 is disposed above the top frame 10C. In the sheet material source 30, the sheet 31 is supported in the form of a sheet material roll 32 on a support shaft 32A, and one end of the sheet material 31 is paid off the sheet material roll 32. The paid-off end of the sheet material 31 is led via the roller 24A in the sheet material pre-heater 24 into between the sealer 28 and the flange 16A of the container 16. At the time of the sealing, the shaft 32A is braked with a minimum necessary brake force, thus preventing wrinkles or non-uniform burn in the sheet material 31.

The container sealer having the above construction operates as follows.

First, as shown in FIG. 4, the flanges 16A of containers 16, which are plastic containers used as food containers or the like, are supported on the support part 12A of respective buckets 12. In this state, the containers 16 are fed one after another into the apparatus frame 14 by driving the chains 20 from a motor (Not shown) in the direction of arrow A. The buckets 12 are moved at this time with their bottom in frictional contact with the rails 22.

When each container 16 is conveyed into the apparatus frame 14, its flange 16A is engaged by the pre-heating rollers 26B of the container pre-heater 26. At this time, the pre-heating rollers 26B have been pre-heated to a predetermined temperature by a heater (not shown), and the flange part 16A is pre-heated by the pre-heating rollers 26B in rolling contact with it.

The sheet material 31 to be fused to the flange part 16A is paid off the sheet material roll 32 of the sheet material source 30 to be led via the roller 24A of the sheet material pre-heater 24 into between the sealer 28 and the flange part 16A of the container 16. The roller 24A pre-heats the sheet material 31 to 50° to 120° C. by causing rotation of the sheet material. The temperatures of pre-heating of the flange part 16A and sheet material 31 are 50° to 120° C., and they are specifically determined by the materials of the container 16 and sheet material 31. If the pre-heating temperature is below 50° C., it is impossible to permit sufficiently fast sealing. If the pre-heating temperature is above 120° C., on the other hand, the sheet material is excessively heated to result in generation of wrinkles.

The flange part 16A of the container 16 and the sheet material 31, which have been led to the sealer 28, are thermally fused together at a temperature between 195° and 225° C. while they are pushed together between the two sealing rollers 28B of the sealer 28 and the support part 12A of the bucket 12 with a pressure of 20 to 50 kgf/cm². If the pressure is below 20 kgf/cm², sufficient seal property can not be ensured. If the pressure is above 50 kgf/cm², on the other hand, such problem as deformation of the flange is posed.

The container 16 with the sheet material 31 fused thereto, is detached together with the sheet material 31 from the bucket 12, as shown in FIG. 1, to be led to a position of a cutter (not shown), for cutting the sheet material 1, whereupon the sheet material 31 is cut to bring an end to the operation of sealing the container 16.

As shown, in this embodiment the flange part 16A of the container 16 and the sheet material 31 are pre-heated by the container and sheet material pre-heaters 26 and 24, respectively. It is thus possible to heat the flange part 16A and sheet material 31 fast up to the fusible temperature, thus permitting curtailing of the time required for thee fusion.

Since the sheet material 31 is pushed against the support part 12A of the bucket 12 by the two sealing rollers 28B. It is thus possible to obtain reliable fusing, and the invention is applicable to various containers having various shapes. Further, since the bottom of the bucket 12 is moved in frictional contact with the rails 22, the downward movement of the bucket 12 by the sealing rollers 28B is restricted, and from this standpoint as well reliable fusing can be obtained.

Further, since the flange part 16A of the container 16 is reliably secured in position by the anti-slip means 13, 42 or 46 provided on the support part 14A, it is possible to prevent deviation of the flange part 16A by the rolling of the sealing rollers 28B.

Further, since the sealer uses two sealing rollers 28B, an efficient fusing operation can be obtained. Further, since the sealing rollers 28B are driven for rotation by the motor 28C, the sheet material 31 is not pulled by the sealing rollers 28B at the time of the fusion, thus ensuring a proper fusing operation. Further, since the container and sheet material pre-heaters 26 and 24 are constructed with the pre-heating rollers 26B and 24B, it is possible to efficiently pre-heat the flange 16A and sheet material 31.

To verify the effects of the above embodiment, examples using the roller type sealer noted above and Comparative examples will be explained.

EXPERIMENT EXAMPLES

Experiment Example 1

As the container 16 was used those made of polypropylene (PP) used for preservation and transport of food, with the flange 16A having a thickness of 350 to 400 microns. As the sheet material 31 was used one, which comprised a base layer of polyethylene telephthalate (PET) and a sealant layer of polypropyrene and has a thickness of 100 microns.

The temperature of pre-heating of the flange 16A by the container pre-heater 26 was set to 140° C. The temperature of pre-heating of the sheet material 31 by the sheet material pre-heater 24 was set to 120° C. The temperature of sealing by the sealing means 28 was set to 225° C. The sealing pressure was set to 30 kgf/cm². As the bucket 12 were used those with the support part 12A thereof roulette processed as shown in FIGS. 5 and 6.

Experiment Example 2

Experiment Example 2 is the same as Experiment Example 1 except that the temperature of pre-heating of the flange 16A and sheet material 31 were set to 50° C.

Experiment Example 3

Experiment Example 3 is the same as Experiment Example 1 except that the temperature of pre-heating of the flange 16A was set to 120° C. and that the temperature of sealing by the sealing means 28 was set to 225° C.

Experiment Example 4

Experiment Example 4 is the same as Experiment Example 1 except that the temperatures of preheating of the flange 16A and sheet material 31 were set to 70° C. and that the temperature of sealing by the sealing means 28 was set to 213° C.

Experiment Example 5

Experiment Example 5 is the same as Experiment Example 1 except that the temperature of pre-heating of the flange 16A was set to 120° C. and that the temperature of sealing by the sealing means 28 was set to 195° C.

COMPARATIVE EXAMPLES

Comparative Example 1

In Comparative Example 1, the prior art stamping apparatus was used, and without pre-heating the flange 16A and the sheet material 31 the sealing operation was carried out at a sealing temperature of 200° C. and with a sealing pressure of 10 kgf/cm$^2$.

Comparative Example 2

Comparative Example 2 is the same as Comparative Example 1 except that the sealing temperature was set to 210° C.

Comparative Example 3

Comparative is the same A Comparative Example 1 except for that the sealing temperature was set to 220° C. and that the sealing pressure was set to 9 kgf/cm$^2$.

Comparative Example 4

Comparative Example 4 is the same as Comparative Example 1 except for that using the sealing apparatus noted above the sheet material 31 and container 16 were held at normal temperature without operating the container and sheet material pre-heaters 26 and 24 prior to the operation of the sealing means 28.

Comparative Example 5

Comparative Example 5 is the same as Comparative Example except that using the sealing apparatus noted above the container 16 was held at normal temperature without operation of the container pre-heater 26 while pre-heating the-sheet material 31 to 120° C. by operating the sheet material pre-heater 24.

Comparative Example 6

Comparative Example 6 is the same as Comparative Example 1 except that using the sealing apparatus noted above the sheet material 31 was held at normal temperature without operating the sheet material pre-heater 24 while pre-heating the flange 16A of the container 16 to 120° C. by operating the container pre-heater 26.

Table 1 shows the results of experiments.

TABLE 1

| | Sealing method | Sealing conditions | | Pre-heating temperature (°C.) | | Sealing speed (qu./min.) | Seal |
|---|---|---|---|---|---|---|---|
| | | Temperature (°C.) | Pressure (kgf/cm$^2$) | Flange | Sheet material | | |
| Exp. Ex. 1 | Roller | 225 | 30 | 140 | 120 | 60 | Satisfactory |
| Exp. Ex. 2 | Roller | 225 | 30 | 50 | 50 | 60 | Satisfactory |
| Exp. Ex. 3 | Roller | 200 | 30 | 120 | 120 | 60 | Satisfactory |
| Exp. Ex. 4 | Roller | 213 | 30 | 70 | 70 | 60 | Satisfactory |
| Exp. Ex. 5 | Roller | 195 | 30 | 120 | 120 | 60 | Satisfactory |
| Comp. Ex. 1 | Stamping | 200 | 10 | — | — | 20 | Satisfactory |
| Comp. Ex. 2 | Stamping | 210 | 10 | — | — | 20 | Satisfactory |
| Comp. Ex. 3 | Stamping | 220 | 9 | — | — | 20 | Satisfactory |
| Comp. Ex. 4 | Roller | 225 | 30 | normal temp. | normal temp. | 45 | Satisfactory |
| Comp. Ex. 5 | Roller | 225 | 30 | normal temp. | 120 | 50 | Satisfactory |
| Comp. Ex. 6 | Roller | 225 | 30 | 120 | normal temp. | 48 | Satisfactory |

As the results of experiments, in Experiment Examples 1 to 5 it was possible to obtain fast sealing of 60 sealings per minute. In Comparative Examples 1 to 3 using the prior art stamping apparatus, on the other hand, the sealing rate was 20 sealings per minute at most. It will be seen that In the embodiment of the method of and apparatus for sealing the flange 16A and sheet material 31 are pre-heated with the container and sheet material pre-heaters 2 and 24 prior to the fusion of the sheet material 31. It was thus possible to reduce the time required for the fusion, and the number of sealings obtainable could be increased to three times that obtainable with the prior art sealing method.

In Experiment Example the sealing temperature is high compared to Comparative Example. This sealing temperature could be reduced down to 200° C. by heating the bucket 12 (to 50° to 120° C.).

Further, it will be seen from Comparative Examples 4 to 6 that sufficient sealing speed improvement can not be obtained even by using the sealing apparatus unless the flange 16A and sheet material 31 are pre-heated by operating both the container and sheet material pre-heaters 26 and 24.

Figure 9:
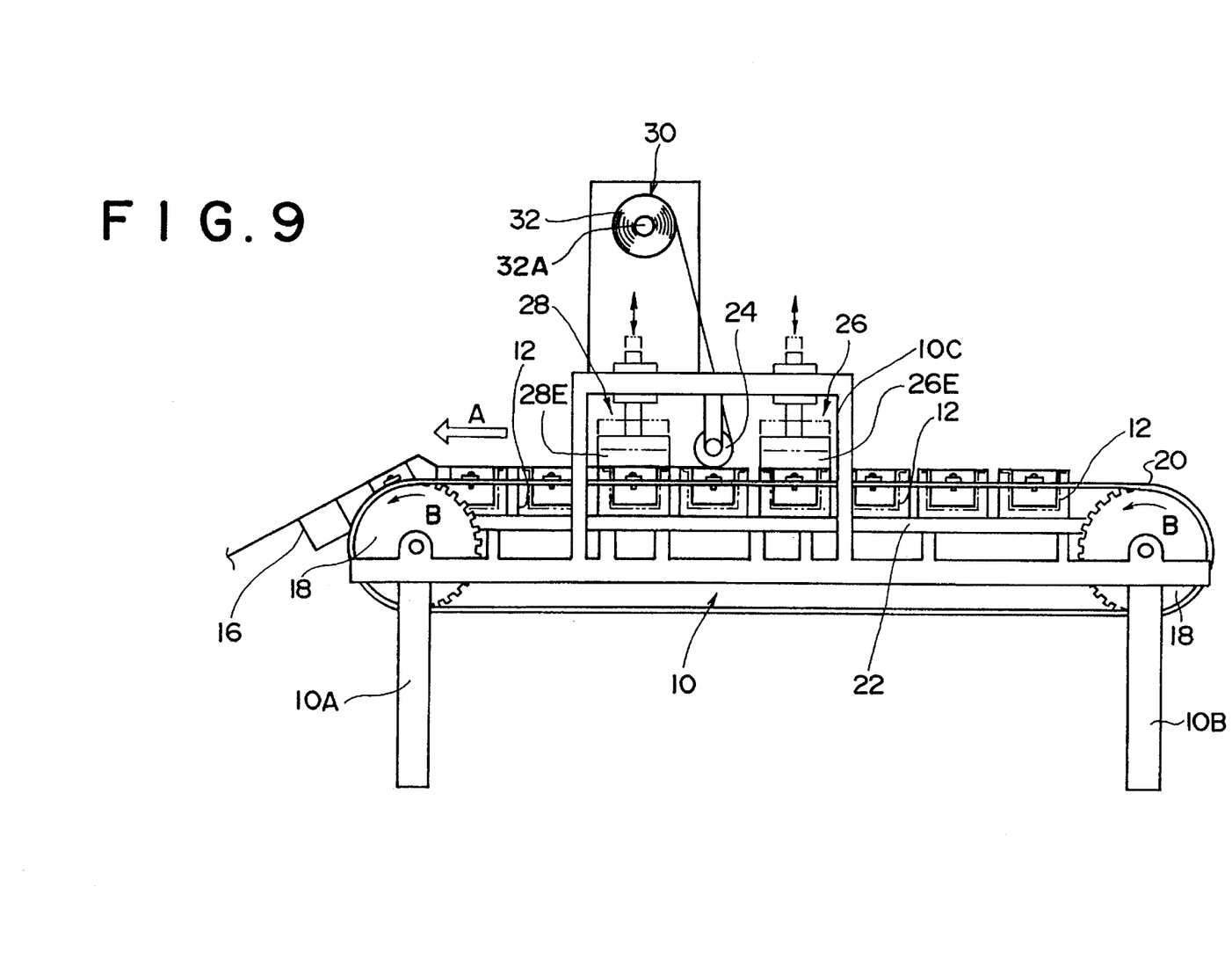
FIG. 9 is a view similar to FIG. 1 but showing a modification of the embodiment of the sealing apparatus according to the invention.

In the above embodiment, the sealing rollers 28B were used as sealing means 28 and pre-heating rollers 26B as container pre-heaters. However, as shown in FIG. 9, it is possible to use a sealing and a pre-heating bar 28E and 26E, which are advanced and retreated with respect to the bucket 12, in lieu of the sealing and pre-heating rollers 28B and 26B. Further, it is possible to use more than two sealing rollers.

Further, as means for securing the flange 16A of the container 16 to the bucket 12 it is possible to use vacuum suction or the like in lieu of the anti-slip means 13, 42 and 46. Further, as means for moving the bucket it is possible to use a timing belt in lieu of the chains 20.

As has been described in the foregoing, according to the invention the container and thermoplastic resin sheet or film are pre-heated prior to the fusion of the thermoplastic resin sheet or film. Thus, it is possible to reduce time required for the fusion and increase the speed of the process.

What is claimed is:

1. A method of sealing containers, comprising the steps of:

providing a rim on a bucket with an anti-slip means;

placing a thermoplastic resin container having an open end and an integral peripheral flange encircling the open end into the bucket so that the flange on the container overlies the anti-slip means;

pre-heating a thermoplastic resin sheet or film to a temperature that is in the range of 50° to 120° C.;

pre-heating the flange to a temperature that is in the range of 50° to 120° C.;

overlaying the pre-heated thermoplastic resin sheet or film over the pre-heated flange;

urging the pre-heated thermoplastic resin sheet or film into engagement with the pre-heated flange backed by the anti-slip means with a force that is in the range of 20 to 50 kgf/cm² to cause at least the pre-heated flange to engage the anti-slip means and become fixedly positioned relative to the rim on the bucket thereby positively preventing the occurrence of a relative slipping movement between the rim and the pre-heated flange;

thermally fusing the pre-heated thermoplastic resin sheet or film to the pre-heated flange at a temperature that is in the range of 195° to 225° C.; and wherein the above step of providing the rim on a bucket with an anti-slip means includes the step of burying spikes in the rim so that an exposed portion of the spikes projecting from the rim will engage at least the pre-heated flange during the urging step.

2. The method according to claim 1, wherein the step of burying the spikes in the rim includes the step of predetermining the extent that the exposed portion of the spike projects from the rim to be smaller than a thickness of the pre-heated flange on the container.

3. The method according to claim 1, wherein the urging step includes an engaging of the thermoplastic resin sheet or film with a roller on a side of the sheet or film remote from the pre-heated flange and urging the roller, the sheet or film and thence the pre-heated flange into engagement with the exposed portion of the spikes with the aforesaid force and to effect said thermal fusing of the thermoplastic resin sheet or film to the pre-heated flange.

* * * * *